No. 837,184. PATENTED NOV. 27, 1906.
D. E. BOWN.
ATTACHMENT PLUG.
APPLICATION FILED NOV. 6, 1905.
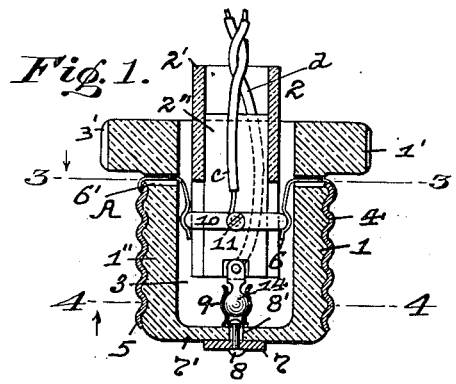
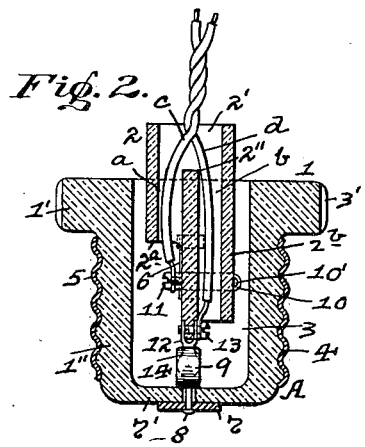
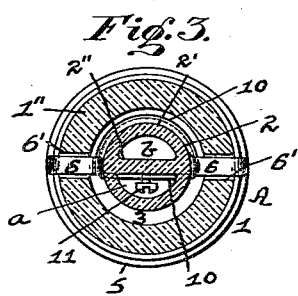
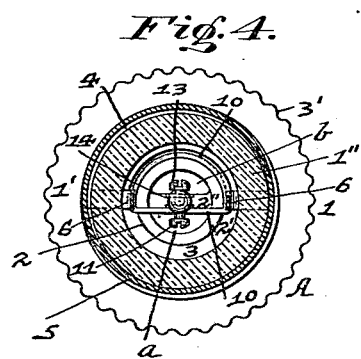
WITNESSES
INVENTOR
David E. Bown,
By J. M. Cooke,
attorney.

UNITED STATES PATENT OFFICE.

DAVID E. BOWN, OF PITTSBURG, PENNSYLVANIA.

ATTACHMENT-PLUG.

No. 837,184.      Specification of Letters Patent.      Patented Nov. 27, 1906.

Application filed November 6, 1905. Serial No. 285,976.

*To all whom it may concern:*

Be it known that I, DAVID E. BOWN, a resident of Pittsburg, in the county of Allegheny and State of Pennsylvania, have invented a new and useful Improvement in Attachment-Plugs; and I do hereby declare the following to be a full, clear, and exact description thereof.

My invention relates to attachment-plugs, and has special reference to such plugs as are used in electric lighting.

The object of my invention is to provide an attachment-plug for the sockets of incandescent lamps in electric lighting, in which the parts forming such plug can be swiveled and attached or detached from each other when desired, as well as such a plug as will be cheap and simple in its construction, will contain few parts, and will be capable of being manufactured easily and assembled easily and rapidly.

To these ends my invention consists, generally stated, in the novel arrangement, construction, and combination of parts, as hereinafter more specifically set forth and described, and particularly pointed out in the claims.

To enable others skilled in the art to which my invention appertains to construct and use my improved attachment-plug, I will describe the same more fully, referring to the accompanying drawings, in which—

Figure 1 is a longitudinal central section of my improved attachment-plug. Fig. 2 is a like view of the same taken at right angles to that shown in Fig. 1. Fig. 3 is a cross-section of the plug on the line 3 3, Fig. 1, and looking in the direction of the arrow. Fig. 4 is a like view on the line 4 4, Fig. 1, and looking in the direction of the arrow.

Like symbols of reference herein indicate like parts in each of the figures of the drawings.

As illustrated in the drawings, A represents my improved attachment-plug, which is composed of the main or body portion 1, preferably formed of porcelain, and the core or terminal-carrying portion 2, also preferably formed of porcelain. The body portion 1 is provided with the head 1' and shank 1", and extending centrally through said head and into said shank is the chamber 3. The head 1' of the body portion 1 is preferably formed integral with the shank 1", and extending around the circumference of such head are a series of indentations 3' for convenience in screwing and unscrewing the plug A into and from the lamp-socket. (Not shown.) Extending around the outer surface of the shank 1" of the body portion 1 are screw-threads 4, with which a screw-cap 5 is adapted to engage, and to one end of this screw-cap 5 and adjacent to the head 1' on said body portion are connected spring-clips 6, which extend through openings 6' in said shank 1" and into the chamber 3 of said body portion. On the inner end portion 7' of the shank 1" on said body 1 is a plate 7, which is soldered to the outer face of said end and has a bolt 8' in said end, so that the inner headed end of said bolt can engage with the lower part of spring-clips 9 within said chamber and hold the same in place against said end 7'.

The core or terminal-carrying portion 2 is formed of the tube 2' and is adapted to fit within the chamber 3 of the main or body portion 1, while within said tube 2' is the division-wall 2", which extends from a point within said tube and away from the outer end thereof to a point slightly below one end of the same and forms the passage-ways *a* and *b* on each side of the same within said tube 2'. One side of the tube 2' of the terminal-carrying portion 2 is cut away, as at 2ª, and around the projecting portion 2ᵇ of said tube, extending below the cut-away portion of the same, is a rib 10', on which fits a ring 10 and which also fits around the outer face of the division-wall 2". A set-screw 11 passes through said ring 10 and engages with the outer face of the division-wall 2" to form a terminal for one of the wires *c*, which passes through the passage-way *a* in the tube 2' and is connected in the usual manner at its inner end to said terminal 11. The inner end of the division-wall 2' has a U-shaped piece 12 fitting around the same and is secured thereto by means of a set-screw 13, which extends through an opening in one side of said U-shaped piece through an opening in the end of said division-wall and engages with a threaded opening in the other side of the U-shaped piece to form a terminal for the other wire *d*, passing through the passage-way *b* in said tube 2' and connected in the usual manner at its inner end to said terminal. Extending out from the U-shaped piece 12 is a rounded or circular knob 14, and this knob is adapted to fit within and between the spring-clips 9 within the chamber 3 and projecting out from the end 7' of the shank 1".

The use and operation of my improved attachment-plug are as follows: After the wires c and d have been attached to the terminals 11 and 13, respectively, by running the same through the passage-ways a and b in the tube 2" of the terminal-carrying portion 2 such portion can then be passed into the chamber 3 of the body portion 1 and in so doing the knob 14 on the inner end of the division-wall 2" in said tube will be sprung into and fit within the spring-clips 9 on the end 7' of the shank 1", while the ring 10 on the said tube and said division-wall will be sprung into and fit within the spring-clips 6, extending within said chamber from the spring-cap 5. When the terminal-carrying portion 2 is thus in place in the body portion 1, the plug A is complete and can be inserted in the usual manner within the lamp-socket, and when it is desired to withdraw said portion from the body portion 1 for any purpose it can easily be pulled out of said body portion with a slight pressure to free the ring 10 and knob 14 from the clips 6 and 9, respectively, and then can be inserted back into place, as before described. When the plug A is being screwed to place within the lamp-socket or at any time thereafter, the terminal-carrying portion 2 can be swiveled on the body portion 1 of said plug by said portion 2 turning around within the body 1 by the ring 10 and knob 14, moving around within the spring-clips 6 and 9, respectively.

It will thus be seen that my improved attachment-plug provides for a convenient and efficient swiveled connection of the parts, so that it will overcome any twisting of the wires when it is being placed within the lamp-socket or in its withdrawal therefrom, while at the same time the part carrying the terminals and wires can be readily detached from the body portion of the plug for any purpose desired and put back into place quickly and conveniently and without any effort or undue pressure being exercised with the same.

What I claim as my invention, and desire to secure by Letters Patent, is—

1. An attachment-plug comprising a body portion, a terminal-carrying portion for fitting within said body portion, and means engaging with the terminal-carrying portion for enabling the same to be swiveled upon and detached from said body portion.

2. An attachment-plug comprising a body portion, a terminal-carrying portion for fitting within said body portion, and spring connections between said body portion and terminal-carrying portion for the terminal-carrying portion to be swiveled upon and detached from said body portion.

3. An attachment-plug comprising a body portion, a terminal-carrying portion for fitting within said body portion, and spring-clips within said body portion engaging with said terminal-carrying portion for said carrying portion to be swiveled upon and detached from said body portion.

4. An attachment-plug comprising a body portion, a terminal-carrying portion for fitting within said body portion and having rounded portions thereon, and spring-clips within said body portion engaging with said rounded portions for said carrying portion to be swiveled upon and detached from said body portion.

5. An attachment-plug comprising a body portion having openings in the same, a screw-cap on said body portion, a terminal-carrying portion for fitting within said body portion and having rounded portions thereon, and spring-clips extending from said cap through said openings and from the end of said body portion engaging with said rounded portions for said carrying portion to be swiveled upon and detached from said body portion.

In testimony whereof I, the said DAVID E. BOWN, have hereunto set my hand.

DAVID E. BOWN.

Witnesses:
J. N. COOKE,
R. H. AXTHELM.